United States Patent [19]

Nielsen

[11] Patent Number: 4,728,341

[45] Date of Patent: Mar. 1, 1988

[54] METHOD FOR TREATING, IN TRANSIT, HYDROCARBON GASES CONTAINING CARBON DIOXIDE AND POTENTIAL ATMOSPHERIC POLLUTANTS

[76] Inventor: Jay P. Nielsen, 3490 Monte Verde Dr., Salt Lake City, Utah 84109

[21] Appl. No.: 540,898

[22] Filed: Oct. 11, 1983

Related U.S. Application Data

[63] Continuation-in-part of Ser. No. 315,131, Oct. 26, 1981, abandoned.

[51] Int. Cl.$^4$ .................................................. F17D 0/2
[52] U.S. Cl. .......................................... 48/190; 48/210
[58] Field of Search .................... 48/190, 210; 62/27, 62/28, 24, 23; 134/22.11, 22.12

[56] References Cited

U.S. PATENT DOCUMENTS

| | | | |
|---|---|---|---|
| 3,349,571 | 10/1967 | Nebgen | 62/23 |
| 3,432,383 | 3/1969 | Russell | 134/22.12 |
| 3,513,660 | 5/1970 | Becker | 62/28 |
| 3,614,872 | 10/1971 | Tassoney et al. | 62/23 |
| 4,099,383 | 7/1978 | Paull et al. | 48/197 R |
| 4,124,065 | 11/1978 | Leitner et al. | 134/22.11 |

OTHER PUBLICATIONS

R. H. Perry, "Chemical Engineers' Handbook", 1973, pp. 11-20, 11-21, 4th edition.

Primary Examiner—Peter Kratz
Attorney, Agent, or Firm—Philip A. Mallinckrodt; Robert R. Mallinckrodt

[57] ABSTRACT

The invention is a method for transporting and for treating during transport a gas containing potential atmospheric pollutants, including carbon dioxide making use of the extensive heat exchange area so provided, to obtain either a clean-burning fuel gas or a residual gas that can be discharged into the atmosphere without danger of significant atmospheric pollution. A cross-country pipeline is structurally modified or initially constructed to circulate coolant fluid along circumferential positions thereof, preferably by externally jacketing such portions and circulating coolant fluid therethrough, and to provide a gravity settlement chamber therein for carbon dioxide snow and particulate matter and a mechanical arrangement, such as a ram, for pushing any previously precipitated matter into such chamber. At least some of the coolant fluid is of low temperature type, particularly the carbon dioxide, and is circulated through a refrigerating compressor so as to change the state of various of the atmospheric pollutants contained by the gas to the liquid or solid phase, and provision is made (e.g. by the gravity settlement chamber) for separating liquid and solid products from the residual gas.

3 Claims, 12 Drawing Figures

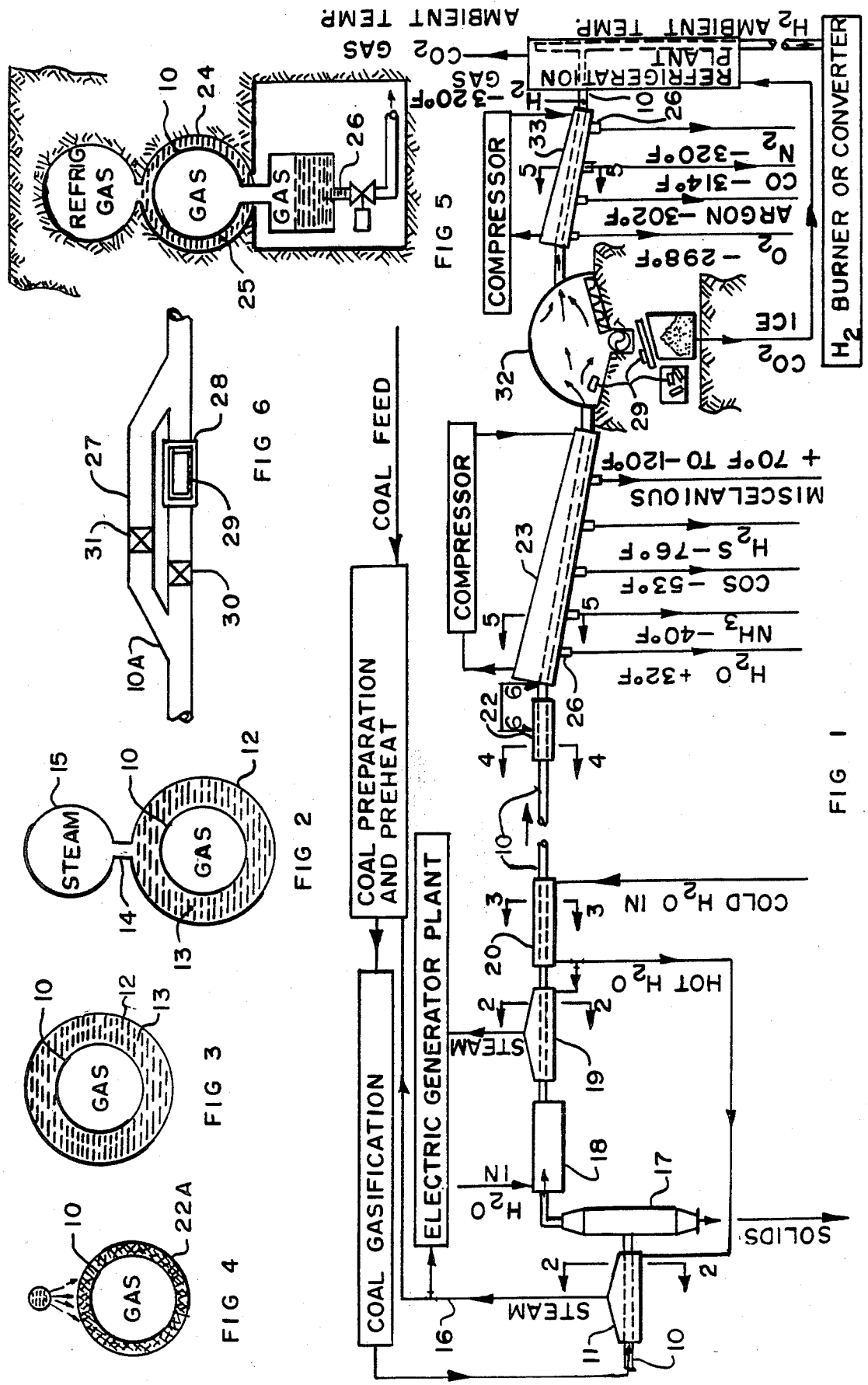

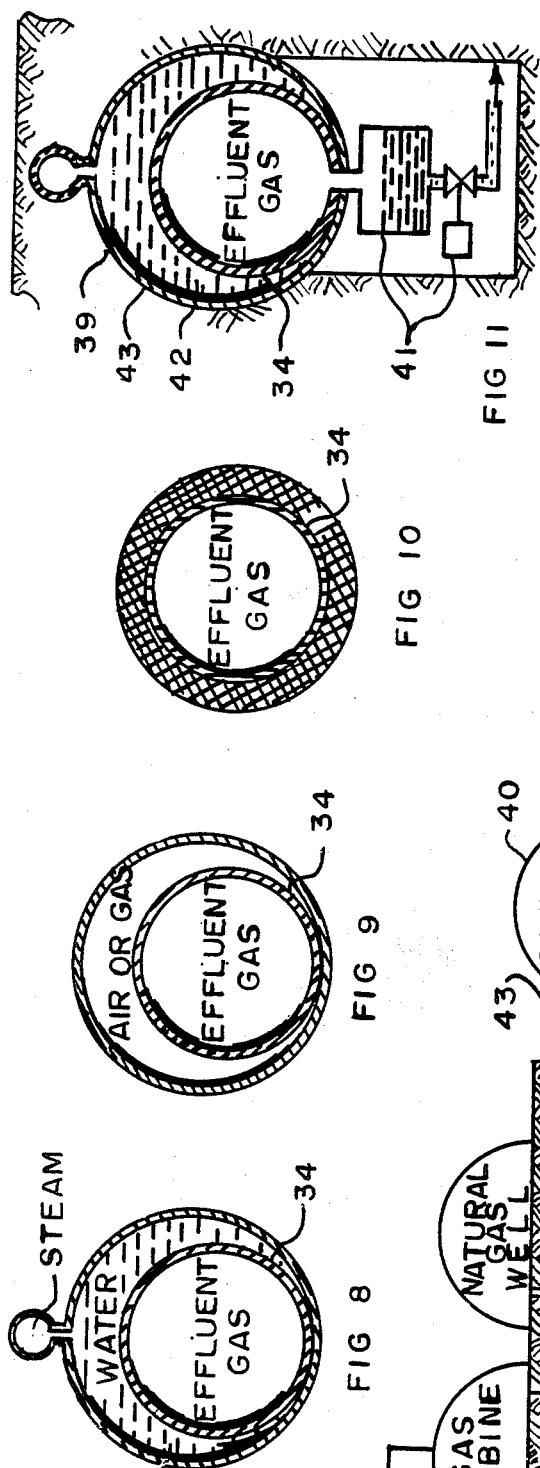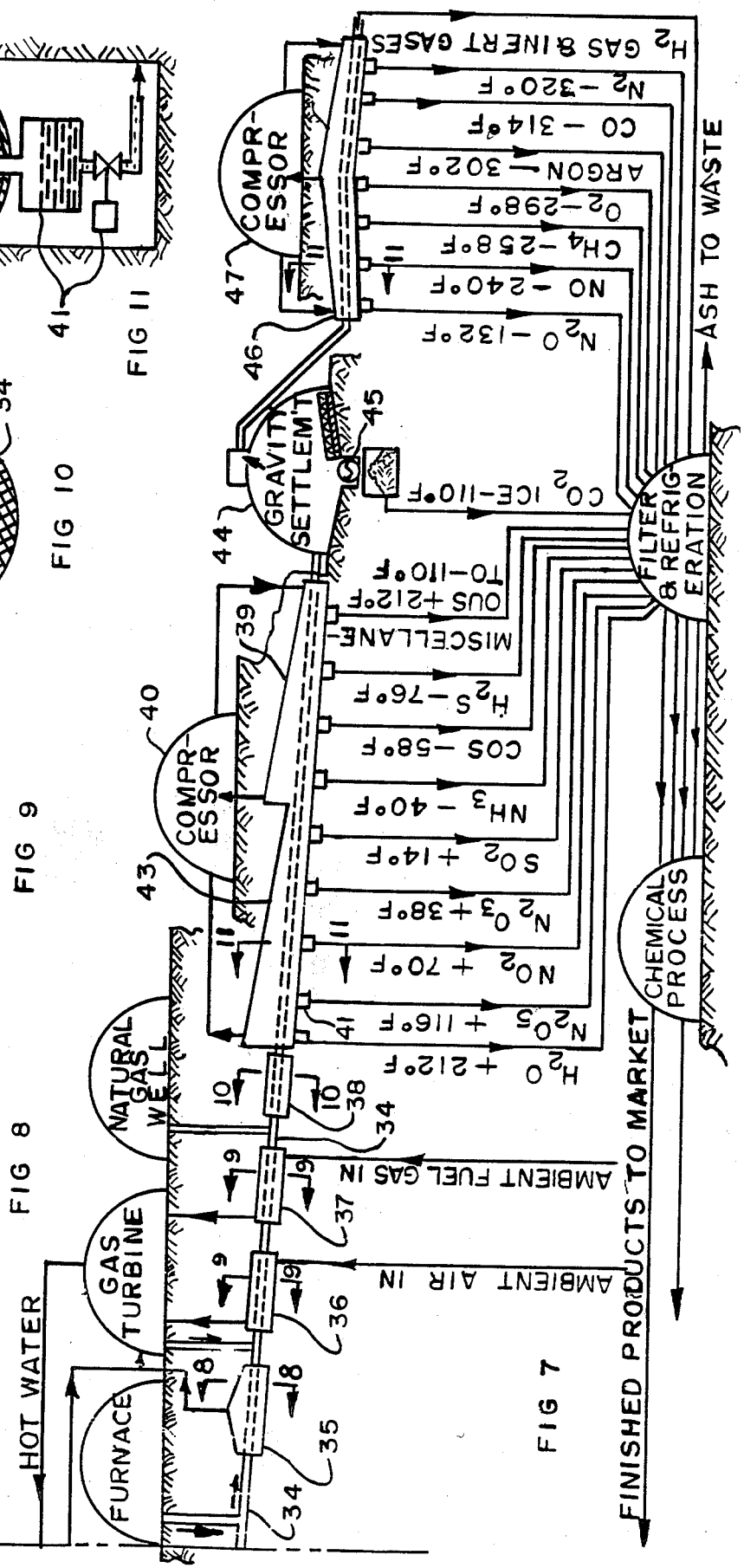

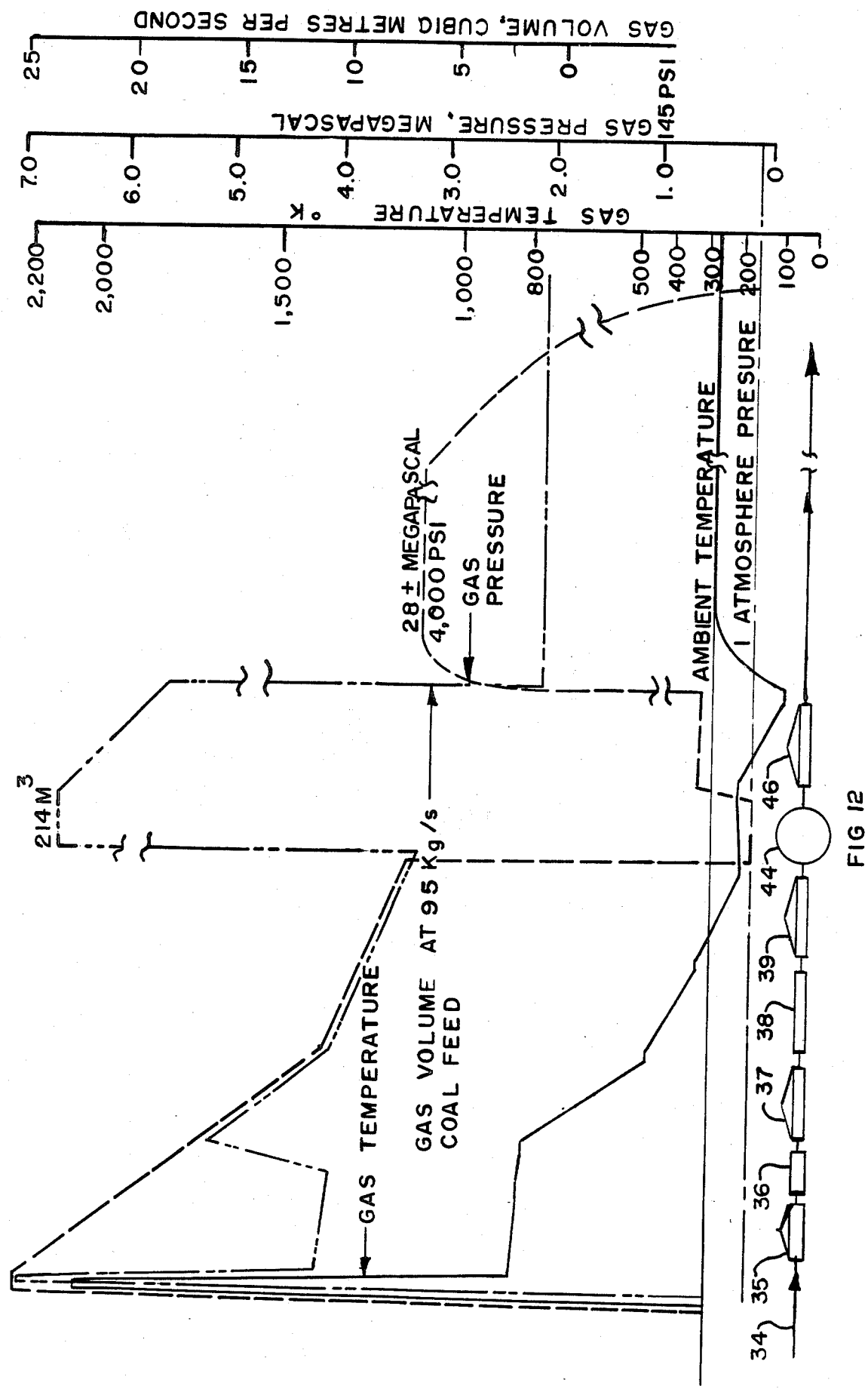

METHOD FOR TREATING, IN TRANSIT, HYDROCARBON GASES CONTAINING CARBON DIOXIDE AND POTENTIAL ATMOSPHERIC POLLUTANTS

RELATED APPLICATION

The present application is a continuation-in-part of my similarly entitled, copending application Ser. No. 315,131, filed Oct. 26, 1981 now abandoned.

BACKGROUND OF THE INVENTION

1. Field

The invention is concerned with both the treatment and the transportation by pipeline of hydrocarbon gases containing potential atmospheric pollutants, so that a fuel gas, such as "sour" gas from wellheads and fuel gas derived from coal gasification, is delivered at a desired destination as a substantially clean-burning fuel, and so that an exhaust gas, as from gas turbines or coal burners, can be safely discharged into the atmosphere without danger of air pollution.

2. State of the Art

Hydrocarbon gases are normally transported by pipeline from the sources of same to points of distribution and use. It is customary to treat such gases, if treatment is deemed desirable, prior to introducing them into a pipeline for transport or at the destination prior to use.

Although natural gas has long been transported great distances by pipeline for ultimate use as a fuel or as a raw material for industrial use, the energy potential of coal has customarily been exploited by burning the coal to power electrical generators at or as near as possible to the source of the coal and by transmitting the electrical power so generated to densely populated areas for use. This avoids air pollution in such densely populated areas and is cheaper than transporting the coal itself.

Gasification of coal in or near cities and distribution of the resulting gases for use as a fuel has been practiced in the past and is still practiced in various places throughout the world, but whenever economically possible this has been replaced by supplying natural gas by pipeline or by supplying electricity by high voltage power lines as previously indicated. Coal has not been favored as a fuel or other energy source, largely because of atmospheric pollution when burned.

Often natural gas wells produce so-called "sour" gas, which requires treatment for the elimination of sulfur and other compounds that pollute the atmosphere when burned. Again, fuel-burning equipment, such as gas turbines, coal burners, etc., usually emit exhaust gases that heavily pollute the atmosphere unless prohibitively expensive means are utilized to remove the pollutants before the gas is released. Thus, the State of California, for example, prohibits the use of gas turbines or coal burners for the generation of electricity or to power industrial activity.

3. Objectives

In the making of the present invention, primary objectives were to utilize any sensible heat energy of an unpurified fuel gas to maximum extent while transporting it to a point of ultimate use as a fuel; to substantially eliminate possible environmental contaminants of the fuel gas or of other gases during transportation thereof by pipeline, without pollution of the environment; to take advantage of the very substantial economies of pipeline transport of a fuel gas, as opposed to using it at its source for the generation of electricity and then transmitting the electricity, while introducing further economies by utilizing the pipeline as a heat exchanger in the treatment of the gas during transport to both recover sensible heat energy which it may initially contain and to remove potential atmospheric pollutants therefrom so that a substantially clean-burning fuel gas is delivered at the destination. Further objectives were to deliver high purity hydrogen for use as a fuel gas or otherwise, at the exit end of a cross-country gas pipeline into which gas from a coal-gasification plant is fed, to make practical the use of gas turbines in areas where they are ordinarily prohibited, and to provide economically for the elimination of pollutants from any effluent gas and from "sour" natural gas during delivery from the wellhead.

SUMMARY OF THE INVENTION

In accomplishing the foregoing objectives of the invention, a cross-country gas transmission pipeline, as made of the usual steel pipe or other suitable material and having sufficient length to effect required heat transfer from the flowing gas into the pipe wall and thence through the wall into the cooling media, is jacketed at suitable intervals or continuously along its length for the purpose of extracting heat from the gas as it flows past, thereby recovering the heat for some useful purpose where economically desirable, or acting on one or more of the constituents of the gas by a refrigerant to alter its or their characteristics or chemical makeup for the purpose of eliminating potential atmospheric pollution when the gas is burned as a fuel or prior to release of the gas to the atmosphere. Particulate matter carried by the gas may also be largely eliminated and derived products recovered by interposing entrapment devices at appropriate locations along the pipeline. In this way, a clean-burning fuel gas is delivered from the pipeline at the destination at which the gas is to be used as a fuel, or a non-polluting gas is provided at a location at which it is to be discharged to the atmosphere. Carcinogenic matter will have been removed, thereby substantially eliminating public health dangers just beginning to be understood.

The invention provides for the transmission and utilization of energy derived from fossil fuels in an environmentally satisfactory manner and at relatively low cost as compared with the generation and transmission of electrical power.

The exact manner of carrying out the invention will depend upon the condition and costituency of the gas concerned. In many instances, as for example in the handling of the very hot fuel gas obtained from a coal gasificiation plant or emitted as exhaust from a gas turbine or from coal-burning equipment, an initial section of the gas pipeline is jacketed to form, in effect, a steam boiler, whereby heat is extracted from the gas in transit and steam is produced, which may be used in preheating coal fed to the gasification plant or otherwise as may be directed by the economics of the operation. Since the gas will normally contain particuate matter, the temperature-reduced gas may then be passed through a cyclone or other solid-particle-removing apparatus interposed in the pipeline. Thereafter, in the typical instance of gas from a coal gasification plant, the gas is passed through a conventional carbon monoxide shifter, also interposed in the pipeline, wherein the usual catalyst and added $H_2O$ convert the carbon monoxide content of the gas to carbon dioxide and elemental hydrogen.

The resulting gas mixture, if sufficiently hot, is then passed through a second, jacketed, steam boiler section of the pipeline for the further removal of heat and generation of low temperature steam. Further heat is extracted from the continuing gas flow through the pipeline by a hot water heater provided as a next jacketed section of the pipeline. Hot water so obtained is sent back to and utilized in the steam boilers to make the high temperature and the low temperature steam.

In such typical instance, continued flow of the gas through an on-going, unjacketed section of the pipeline, as exposed to naturally cool conditions of the atmosphere or underground, depending upon terrain and climatic conditions, will further cool the flowing gs mixture until it reaches a portion of the pipeline jacketed for evaporative cooling or for the circulation of a refrigerant therearound so as to exert a low-temperature cooling effect on the gas mixture. This may include an evaporatively cooled pipe section followed by a series of refrigerated pipe sections, having condensate bleed-offs, for cooling the gas mixture and for disposing of the resulting liquid condensates of constituents whose corresponding dew points were reached progressively as the gas mixture continues to flow through the pipeline.

Thus, following the condensation of water and depending upon the constituency of the gas mixture, there will, for example, considering the gas produced by a typical coal gasification plant, be eliminated from the gas stream ammonia ($NH_3$), carbon oxysulfide (COS), hydrogen sulfide ($H_2S$), and carbon dioxide in that order, the last subliming directing as solid carbon dioxide "snow" between minus 112° and minus 120° F. Residual, paticulate, frozen matter is then removed by interposing in the pipeline a structure of such size as will cause sudden expansion of the gas mixture and gravity settling of the particulate matter, whereupon the gas mixture may be used as substantially clean-burning fuel or may be passed through a further jacketed secion of the pipeline refrigerated to remove, as liquid condensates, first oxygen at minus 298° F., then argon at minus 302° F., then any remaining carbon monoxide it minus 314° F., and finally nitrogen at minus 320° F. This leaves substantially pure hydrogen to be delivered at the terminus of the pipeline as a clean-burning fuel gas.

Exhaust gases from gas turbines or coal burning equipment, though not normally passed through cross-country pipelines, are so passed in accordance with the invention so as to become non-polluting when discharged into the atmosphere. Thus, after extraction of heat for useful purpose as indicated above, the cooled gas is typically passed through a continuously jacketed length of pipe, usually several miles in length, which may run above ground or underground but, in any event, fits into the category of a cross-country, gas transmission pipeline as that designation is here used. As continuously jacketed, a refrigerant, such as liquid nitrogen, is introduced into the jacket surrounding the pipeline and is kept liquid by circulation through a usual refrigerant compressor. Thus, the exhaust gas introduced into the pipeline may have its useful heat removed first and then be subjected to refrigeration so as to liquify the gaseous constituents substantially in the order of their respective dew points as such gas flows along the jacketed pipeline, the products of liquifaction being drawn off through suitable traps at intervals along the length of the pipeline.

Pumps for insuring proper gas flow may be interposed in the pipeline at appropriate intervals in customary manner. However, the gas need not be under pressure except to insure effective flow. Gas pressure in the pipeline will typically be between atmospheric and a high of about 300 lbs./sq. in.

THE DRAWINGS

In the accompanying drawings, which show what is presently contemplated as the best way of carrying out the invention in actual practice:

FIG. 1 is a schematic representation of a typical cross-country, gas transmission piipeline jacketed at intervals for the purpose of extracting sensible heat from a fuel gas flowing therethrough to a destination for burning as a fuel;

FIGS. 2, 3, 4, and 5, transverse cross-sections through jacketed sections of the pipeline as taken on the lines 2—2, (either one) 3—3, 4—4, and 5—5, respectively;

FIG. 6, a fragmentary plan view, taken on the line 6—6 of FIG. 1, of a section of the pipeline having an opening with a removable cover, the cover having been removed to show an inserted ram for cleaning the pipe of any accumulations of particulate matter made sticky by contact with liquid condensate;

FIG. 7, a schematic view corresponding to that of FIG. 1 but showing how effluent from a coal burner, or a gas turbine, or "sour" gas from a wellhead, is transmitted by a cross-country pipeline and treated as it flows in acordance with the invention;

FIG. 8, a vertical section taken on the line 8—8 of FIG. 7;

FIG. 9, a similar view taken on either of the lines 9—9 of FIG. 7;

FIG. 10, a similar view taken on the line 10—10 of FIG. 7;

FIG. 11, a similar view taken on either of the lines 11—11 of FIG. 7; and

FIG. 12, a typical temperature, pressure, and volume chart applicable to the system of FIG. 7.

DETAILED DESCRIPTION OF THE ILLUSTRATED EMBODIMENTS

A typical application of the invention is the extraction of heat at successive locations along a cross-country gas pipeline carrying a fuel gas, produced by a coal gasification plant, to a populous area remote from the plant for use as a clean-burning fuel in an electric generating plant, in one or more industrial plants of various kinds, or in homes or buildings of various kinds.

Gas transmission pipelines are normally many miles in length running cross-country either above or below ground or having sections of both, and it is a feature of the invention to take advantage of the extensive heat transfer capability thereof by removing heat from the flowing gas at various locations along the length of the pipeline.

In the embodiment illustrated in FIGS. 1-6, a gas pipeline 10, typically made up of individual lengths of steel pipe welded or otherwise joined end-to-end in a gas-tight manner, extends from a source of gas to be transported cross-country, e.g. a coal-gasification plant as indicated, to a destination at the exit end of the pipeline for ultimate use as a fuel. Between the source and the destination are a number of heat-removal stages whereby the gas ultimately arrives at the destination as a substantially clean-burning fuel. In the present instance, in which the incoming gas is considered to eminate from a coal-gasification plant, the final fuel gas is hydrogen.

Chemical analysis of the fuel gas eminating from a typical coal-gasification plant is as follows:

RAW GAS ANALYSIS

| | Volume % Dry Basis |
|---|---|
| CO | 53.18 |
| $CO_2$ | 10.02 |
| $H_2$ | 34.47 |
| $H_2S$ | 1.07 |
| COS | 0.07 |
| $N_2$, Argon, HCN, $NH_3$ | 1.19 |
| TOTAL | 100.00 |

Since the gas in this instance is very hot, about 2700° F., the first heat-extraction stage 11 of the present method and system of apparatus is, as illustrated in FIGS. 1 and 2, a length-section of pipeline 10 jacketed by a larger diameter pipe 12 and insulated to form, in effect, a boiler to confine a body of water 13 for the production of high-temperature steam by extraction of heat from the hot gas in transit. The steam exits by way of nipples 14 into a manifold 15 and is carried by a utility pipe 16 to a point of use, e.g. a preheater as indicated, for coal fed to the gasification plant. The steam may also be used to drive an electric generator for generating electricity, which is transmitted to the several stages of the present method requiring power, e.g. pumps, refrigeration compressors, etc.

Following this first stage 11, it may be preferable to remove particulate solids carried by the flowing gas by passing such gas through apparatus such as a conventional cyclone, indicated at 17, FIG. 1, interposed in pipeline 10.

The gas from cyclone 17 flows into a conventional carbon monoxide-to-hydrogen shifter apparatus 18 also interposed in pipeline 10. This apparatus, operating at a temperature of almost 1000° F., uses a catalyst and the addition of water($H_2O$) to convert carbon monoxide in the gas to carbon dioxide and elemental hydrogen.

The total gas flow from shifter apparatus 18, now containing the carbon dioxide and hydrogen instead of the original carbon monoxide constituent, flows back into pipeline 10 on to a second heat-extraction stage 19, which is similar to first stage 11 but operates as a low temperature steam boiler because of the lower temperature of the gas flow therethrough. The steam from this stage may also be utilized to supply electric power for the purposes above-mentioned.

A third heat-extraction stage 20, FIG. 3, is a similarly jacketed and insulated section of pipeline 10, but operates as a hot water heater, with incoming cold water and with the heated water therefrom being used, among other possibilities, as feed for the steam boilers of the first and second stages.

A fourth heat-extraction stage 21 is merely an appropriate length of pipeline 10 exposed to the atmosphere or to the earth underground, or successively to both, depending on climatic conditions, for further cooling of the flowing gas to the lowest available ambient temperature. The length of this stage may be many miles of the pipeline's total length.

A fifth heat extraction stage 22, FIG. 4, is advantageously an evaporative cooler, depending, of course, on the atmospheric conditions to which this portion of the pipeline is exposed. Evaporative cooling is accomplished along a length of the pipeline 10 which is exposed to the atmosphere and wrapped with burlap 22A or other absorbent material and wetted with water for evaporation.

Following extraction of the maximum amount of heat in the foregoing stages, a length of the pipeline is subjected to intense refrigerated cooling for the further extraction of heat to effect change of state, respectively, of various of the consituents and elimination from the flowing gas of such constituents.

Thus, a sixth heat extraction stage 23, FIG. 5, is provided by a jacket 24 surrounding a preferably downwardly sloping section of pipeline 10 to enable circulation of a refrigerant liquid 25, such as liquid nitrogen, around and along that section of the pipeline to provide the required low temperature within jacket 24. The refrigerant liquid is supplied from and is recirculated through a compressor plant, as indicated, so as to be substantially at a temperature such as will change the state, e.g. from gaseous to liquid, of various of the constituents of the flowing gas which are to be removed. In this instance of a fuel gas from a typical gasification plant, water (above 32° F.) followed by ammonia (−40° F.), carbon oxysulfide (−53° F.), and hydrogen sulfide (−76° F.) will in that order flow as liquids from the bottom of the pipe through respective offtake traps 26 provided for that purpose. These represent chemical byproducts of the method and may be processed further to produce a wide range of chemical products.

Frozen water or soil can serve as effective and inexpensive insulation for the refrigerated stages of the method.

Preferably, just prior to stage 23, the pipeline 10 is branched laterally, as at 10A, FIG. 6, to provide a bypass 27 for the flow of pipeline gas past a removably covered ram housing 28 into which an untethered ram 29 is placed. Such ram 29 is motivated by gas pressure in the pipeline when a valve 30 at the upstream end of the housing is opened and a valve 31 in the bypass branch 10A is closed to force the ram through the pipe and out of the downstream end thereof into and through stage 23. The temperature in stage 23 will be sufficiently low to cause the carbon dioxide component of the gas stream to sublime as $CO_2$ snow, when it expands upon reaching a relatively large, closed vessel 32, which is interposed in pipeline 10. Such vessel 32 has sufficient volume for effective gravity settlement of the $CO_2$ snow and any other solids that might be present, down to a very small particle size.

If and when pipe 10 leading into and passing through stage 23 tends to become clogged with mud formed from precipitated particulate matter, or from any $CO_2$ snow that may form in pipe 10 before reaching vessel 32, valve 31, FIG. 6 is closed and valve 30 opened so that ram 29 is propelled through pipe 10 and into vessel 32, where it can be retrieved and reinserted in ram housing 28. Valve 31 may not be needed, depending upon the velocity of the flowing gas.

The residual gas from vessel 32 may be burned as a fuel following this stage, or it can continue to flow through a seventh heat-extraction stage 33 in pipeline 10, which is a similarly jacketed and refrigerated section of the pipeline wherein the temperature is considerably lower than that reached in the sixth stage, the refrigerant utilized being, for example, liquid hydrogen. The constituency of the residual gas at the beginning of this stage is approximately, by weight, 86% elemental hydrogen, 11% elemental nitrogen, and 3% argon. Since both nitrogen and argon are normal constituents of the atmosphere, burning of the gas as so constituted will impose no significant pollution hazard. However, by subjecting such gas, first, to a temperature of minus 302° F. and, then, to a temperature of minus 320° F. in the seventh heat extraction stage, first argon and then nitrogen are liquified and separately collected, leaving substantially pure hydrogen as the ultimate fuel gas for delivery as the exit end of pipeline 10.

Portions of the gas flow may be completely cleaned of particulate matter by washing, by electrostatic precipitation, or by some other method, which produces cold hydrogen of very strict specifications, such as may be used to power space craft and similar applications, at very low cost. If desired, the hydrogen may be liquified for these uses. Also, the cold hydrogen and/or the carbon dioxide snow from the refrigerated stages may be used in quick-freeze and cold storage warehouses, and $CO_2$ gas from appropriate stages may be piped to greenhouses, oil wells, or for other uses, if desired.

The gas exiting the pipeline is a clean-burning fuel for a variety of purposes, such as to generate electricity, or for use in space heating, or for many other industrial and domestic uses. It is important to note that carcinogens will have been eliminated along with the potential atmospheric pollutants.

Other types of gases handled in accordance with the invention will be constituted somewhat differently. For example, exhaust gases from gas turbines will contain considerable quantities of oxides of nitrogen and carbon dioxide. Such exhaust gases are advantageously discharged from the turbine directly into a cross-country pipeline, similar to that described above in that it is on the order of at least a mile in length, jacketed for the recovery of heat and for refrigerating the gas following initial cooling.

Such a system is shown in FIG. 7 wherein effluent gas from a coal-buring furnace, exhaust gas from a gas turbine, or "sour" natural gas from a wellhead is fed into a pipeline 34 which, like pipeline 10, runs cross-country usually a distance of several miles. Pipeline length in this instance will be determined by the distance required to effect adequate heat transfer to accomplish the purpose of the invention, namely, elimination of most of the air-polluting constituents of the gas concerned, and particulate matter carried thereby, prior to discharge of the residual gas into the atmosphere. Any piping material, such as sulfur concrete, may be used for the required cross-country pipeline to minimize expense.

The stages of heat transfer may be similar to those described in connection with FIG. 1. Thus, jacketed heat recovery stages 35 and 36 for generation of steam, and stage 37 for preheating water used in the preceeding steam generation stages, are shown followed by heat-dissipating stage 38. A by-pass and ram arrangement similar to that at 27, FIG. 6, is preferably inserted in pipeline 34 in advance of refrigerating stage 39 as serviced by compressor 40. Here stage 39 is provided with successive liquid trap and discharge devices 41 respectively, similar to those identified as 26 in FIG. 1, drawing off recovery products such as $H_2O$, $N_2O_5$, $NO_2$, $N_2O_3$, $SO_2$, $NH_3$, COS $H_2S$ which successively form as the temperature of the flowing gas is lowered to and below the respective dew points. Miscellaneous products will form in relatively small quantities at temperatures between 212° F. and $-110°$ F. These may be drawn off whenever formed or in conjunction with the other products and separated therefrom by standard procedures if desired.

A refrigerant 42, FIG. 11, again for example liquid nitrogen, is introduced into the space between pipe 34 and jacket 43 and is kept approximately at liquid temperature, after partial gasification by absorption of heat, by circulation through compressor 40, the absorbed heat being dissipated by the usual cooling system of refrigeration compressor 40.

Beyond refrigeration stage 39, the flowing gas is subjected to expansion and to gravity settlement of particulate matter in a stage 44 corresponding to stage 32 of FIG. 1, any carbon dioxide being sublimed as "snow" prior to or within stage 44 and settling in the catch basin thereof for removal as by means of auger screw 45.

Beyond stage 44, the gas may flow through a second refrigeration stage 46 similar to 39 except for the fact that it operates at lower temperature by use of an ultra low temperature refrigerant, again such as liquid hydrogen, circulating through refrigerating compressor 47. In this second refrigeration stage, ultra low temperature products, such as $N_2O$, NO, $CH_4$, $O_2$, Argon (A), CO, and $N_2$, are drawn off in liquid form, leaving a residual gas which is essentially pure hydrogen and can be utilized or burned.

Depending upon the desired extent of removal of potential pollutants from the gas flowing into and through the system, the gas may be discharged into the atmosphere short of final stages of the system and such final stages may be left out of the system. This is particularly true of natural gas being treated for the removal of sulfur constituents so that it can be used as a relatively non-polluting fuel.

As shown in FIGS. 8 and 9, the pipeline 34 may rest on the bottom of the jacketing pipe for convenience and economy of construction.

The chart of FIG. 12 shows temperatures, pressures, and volumes of a typical gas stream as it flows through the several stages of the system.

The following tables are indicative of operating characteristics and results achieved from a typical systm of FIGS. 1–6 wherein the gas derived from the processing of coal to produce a fuel gas:

TABLE 1

Components emitted from an array of 10 TEXACO RCH/RAG entrained flow coal gasifiers with 80% service factor, consuming 94.5 Kg/s (9000 T/D) coal and yielding 192 sm$^3$/s (180/ Kg/s) (before shift) raw gas. CO shift taken at 90%. After shift, gas weight is 238 Kg/s and volume 270 sm$^3$/s.

| Gas | % Volume | Boiling Temp. °K. | Volume Before "CO" Shift Sm$^3$/s | Volume After "CO" Shift Sm$^3$/s | Gas Weight After CO Shift Kg/s | Weight Kg/m$^3$ | Viscosity @ 753° K. Centipoises | Viscosity @ 188° K. Centipoises | Specific Heat J/Kg (°K.) |
|---|---|---|---|---|---|---|---|---|---|
| CO | 41.16 | 81 | 79.85 | 1.59 | 1.84 | 1.161 | .0352 | .0135 | 1017.4 |
| CO$_2$ | 20.07 | 195 | 42.82 | 120.86 | 221.90 | 1.836 | .0335 | — | 858.3 |
| H$_2$ | 35.01 | 20 | 68.07 | 145.30 | 12.06 | .083 | .0170 | .0068 | 15533.0 |
| H$_2$S | 1.32 | 213 | .68 | .67 | .96 | 1.427 | .0280 | — | 644.8 |
| COS | 0.05 | 223 | .10 | .10 | .25 | 2.520 | .0350 | — | 837.4 |
| N$_2$ | 0.30 | 77 | .59 | .59 | .69 | 1.162 | .0360 | .0135 | 870.9 |

TABLE 1-continued

Components emitted from an array of 10 TEXACO RCH/RAG entrained flow coal gasifiers with 80% service factor, consuming 94.5 Kg/s (9000 T/D) coal and yielding 192 sm$^3$/s (180/ Kg/s) (before shift) raw gas. CO shift taken at 90%. After shift, gas weight is 238 Kg/s and volume 270 sm$^3$/s.

| Gas | % Volume | Boiling Temp. °K. | Volume Before "CO" Shift Sm$^3$/s | Volume After "CO" Shift Sm$^3$/s | Gas Weight After CO Shift Kg/s | Weight Kg/m$^3$ | Viscosity @ 753° K. Centipoises | Viscosity @ 188° K. Centipoises | Specific Heat J/Kg (°K.) |
|---|---|---|---|---|---|---|---|---|---|
| HCN | .00 | 299 | .00 | .00 | .00 | 1.146 | .0300 | — | 795.5 |
| NH$_3$ | .00 | 240 | .00 | .00 | .00 | .704 | .0260 | — | 2126.9 |
| Argon | .09 | 87 | .18 | .18 | .30 | 1.648 | .0450 | .0165 | 502.4 |
| H$_2$O | — | 373 | 76.11 | 0 | — | .762 | .0280 | — | 2093.4 |
| Totals | 100.00% | | 268.40 | 269.29 | 238.00 | | | | |
| Weighted average after CO shift | | | | | | 9.37 | | | |
| Weighted average viscosity at 753° K. | | | | | | | .0246 | | |
| Weighted average viscosity at 188° K. | | | | | | | | .00692 | |
| Weighted average specific heat after CO shift | | | | | | | | | 1598.0 |

NOTE:
H$_2$O required to shift CO is 58 Kg/s including original and makeup water.

TABLE 2

Feeds and products based on the array of 10 TEXACO RCH/AG gasifiers @ 80% service factor.

Feed:
Coal: 94.5 Kg/s (9,000 T/Day) @ 11,709 BTU/lb., net heating value. Combustion heat value is 2573.4 megajules/second (7.69 E + 13 BTU/yr.)
Water: 168 Kg/s (2,805 ac. ft./yr.)
Products: Sensible heat: This energy is calculated as follows: 238 kg/s raw gas emission with a weighted average specific heat of 1598 J/kg(°K.). Allowing for heat loss of 25% in high pressure steam boiler, shifter, and the balance of the process, leaving 75% recovery. The maximum temperature is taken at 1606° K. (2400° F.) and final temperature 77° K.

| Product | Kg/sec. | T/D |
|---|---|---|
| H$_2$S (sulphur dioxide) | .96 | 91.4 |
| COS (carbon oxysulfide) | .25 | 23.8 |
| NH$_3$ (ammonia) APX | .00 | 00.0 |
| Argon | .30 | 28.6 |
| N$_2$ (elemental nitrogen) | .69 | 65.7 (liquid or gas) |
| CO$_2$ (carbon dioxide) | 221.90 | 21134.0 (ice or gas) |
| CO (carbon monoxide) | 1.84 | 175.2 |
| H$_2$ (hydrogen) | 12.02 | 1144.8 |
| Totals | 237.96 | 22663.5 |

| | MJ/s | BTU/Yr. |
|---|---|---|
| Refrigeration (H$_2$ Temp. rise 77° K. to 260° K.) | 41.00 | .12 E + 13 |
| Refrigeration (CO$_2$ from ice to gas at 260° K.) | 13.28 | .04 E + 13 |
| Sensible heat | 455.00 | 1.36 E + 13 |
| Combustion heat value (hydrogen) | 1725.00 | 5.16 E + 13 |
| Combustion heat value of CO | 26.53 | .07 E + 13 |
| Totals | 2260.81 | 6.75 E + 13 |

Net thermal efficiency = 5.23/7.69 = 68.0% for H$_2$ and CO only. For total energy net thermal efficiency = 6.75/7.69 = 88%.

Although the technology employed for removing the various pollutants from a gas stream is well known and certain aspects thereof have been proposed heretofore utilizing complicated in-plant piping systems, the carrying out of such technology in a cross-country pipeline during transmission of a gas from its source is unique with this invention. Extraction of the necessary quantities of heat from the gas is the critical factor and requires very extensive interface area between the gas and a cooling surface per degree of temperature differential regardless of the heat transfer characteristics of the material providing the cooling surface. Thus, according to Marks Mechanical Engineering Handbook, 6th Edition, pages 4-106 and 4-107, the rate of heat transfer from a gas into the walls of a conducting pipe, regardless of material from which the pipe is made, is very slow. Very large interface areas are required for effective cooling. Except in special instances, such as shown by the patents to Tassoney et al., U.S. Pat. No. 3,614,872, and to Nebgen, U.S. Pat. No. 3,349,571, where high gas pressures are employed, only carbon dioxide is involved, and operation is at low efficiency, the requirement for large interface areas to effect heat transfer makes the use of the known technology impractical. However, by using a cross-country pipeline in accordance with the present invention, effective heat transfer is accomplished during the long distances necessary for gas transmission. It has not been obvious to the art concerned that required cooling for substantial elimination of pollutants could be effected during the long distances involved in gas transmission.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A method of treating a gas containing potential atmospheric pollutants to make it safe for burning or for release into the atmosphere, comprising introducing such a gas into a cross-country pipeline having extensive heattransfer surface area exposed to said gas, for transmission to a desired location; progressively removing heat from the gas as it flows along said pipeline by passing coolant fluid along respective longtitudinal portions of said pipeline in heat exchange relationship therewith; refrigerating at least a portion of said coolant fluid so that the extent of heat removal along certain of said portions is such as to change the state of various of said potential atmospheric pollutants from the gaseous to the liquid or solid phase; and separating said pollutants in their liquid or solid form from the residual gas substantially at the respective portions of said pipeline, wherein the flow of gas contains carbon dioxide; wherein the gas is cooled to or about the subliming temperature of the carbon dioxide; and wherein the cooled gas is passed into a gravity settlement expansion chamber for sublimation into carbon dioxide snow and settlement along with other particulate matter carried by the gas.

2. A method in accordance with claim 1, wherein mechanical means are provided for pushing precipatated solids along the pipe and into the gravity settlement chamber; and wherein said mechanical means is operated from time to time to clean the pipe.

3. A method in accordance with claim 2, wherein the mechanical means comprise a pipeline-pressure-driven ram, and said ram is inserted in the pipeline from time to time to clean the pipe.

* * * * *

UNITED STATES PATENT AND TRADEMARK OFFICE
CERTIFICATE OF CORRECTION

PATENT NO.   : 4,728,341

DATED        : March 1, 1988

INVENTOR(S)  : Jay P. Nielsen (should be Jay P. Nielson)

It is certified that error appears in the above-identified patent and that said Letters Patent is hereby corrected as shown below:

Column 2, line 50, "costituency" should be "constituency"; line 53, "gasificiation" should be "gasification"; line 60, "particuate" should be "particulate".

Column 3, line 14, "gs" should be "gas"; line 23, "were" should be "are"; line 31, "directing" should be "directly"; line 41, "it" should be "at"; line 64, "liquifaction" should be "liquefaction".

Column 4, line 11, "piipeline" should be "pipeline"; line 66 into 67, "eminate" should be "emanate".

Column 5, line 1, "eminating" should be "emanating".

Column 6, line 7, "consituents" should be "constituents".

Column 7, lines 5 and 13, "liquified" should be "liquefied"; line 7, "as" should be "at"; line 36, "coal-buring" should be "coal-burning".

Column 8, line 6, there should be a comma after "COS"; line 53, "systm" should be "system"; line 54, the word "is" should be inserted after "gas".

Column 9, line 22, "megajules" should be "megajoules".

Claim 1, line 41, "heattransfer" should be "heat transfer"; line 44, "longtitudinal" should be "longitudinal".

UNITED STATES PATENT AND TRADEMARK OFFICE
CERTIFICATE OF CORRECTION

PATENT NO.   : 4,728,341
DATED        : March 1, 1988
INVENTOR(S)  : Jay P. Nielsen (should be Jay P. Nielson)

It is certified that error appears in the above-identified patent and that said Letters Patent is hereby corrected as shown below:

In the Abstract, line 3, there should be a comma after "dioxide".

It is noted that the word "miscellaneous" is mis-spelled in Fig. 1 of the drawing, and the word "pressure" in Fig. 12.

On the title page, Item [76] "Jay P. Nielsen" should read

-- Jay P. Nielson --.

Item [19], "Nielsen" should read -- Nielson --.

Signed and Sealed this

Eighteenth Day of July, 1989

*Attest:*

DONALD J. QUIGG

*Attesting Officer*    *Commissioner of Patents and Trademarks*